United States Patent [19]
Scholes et al.

[11] 3,819,404
[45] June 25, 1974

[54] METHOD FOR TREATING VITREOUS SURFACES

[75] Inventors: Addison B. Scholes; Joseph J. Kozlowski, both of Muncie, Ind.

[73] Assignee: Ball Corporation, Muncie, Ind.

[22] Filed: Apr. 4, 1972

[21] Appl. No.: 240,960

[52] U.S. Cl................. 117/106 R, 117/124, 118/48
[51] Int. Cl............................................. C23c 11/08
[58] Field of Search............ 117/106, 107.1, 107.2, 117/124; 118/48, 49, 50

[56] References Cited
UNITED STATES PATENTS

| | | | |
|---|---|---|---|
| 2,375,482 | 5/1945 | Lyle | 117/106 |
| 3,561,940 | 2/1971 | Scholes | 117/124 |
| 3,623,854 | 11/1971 | Frank | 117/124 |
| 3,684,469 | 8/1972 | Goelzer et al. | 117/107.2 |
| 3,689,304 | 9/1972 | Bamford | 117/124 |

Primary Examiner—Douglas J. Drummond
Assistant Examiner—J. Massie
Attorney, Agent, or Firm—Gilbert E. Alberding

[57] ABSTRACT

Apparatus and method for surface treating vitreous materials with treatment gases to form a smooth metallic oxide surface coating having constant thickness on the vitreous material. The apparatus, which is preferably an enclosure mounted over a conveyor belt and which includes an entrance and exit end, incorporates a plenum chamber or gas distribution means for distributing treatment gas highly diluted in an inert carrier gas such as dry air within the enclosure at high velocity. The method comprises applying the highly diluted treatment gas at high velocity to the vitreous surface to provide an efficient use of the treatment gas as well as a smooth metallic oxide coating having constant thickness on the vitreous material.

5 Claims, 8 Drawing Figures

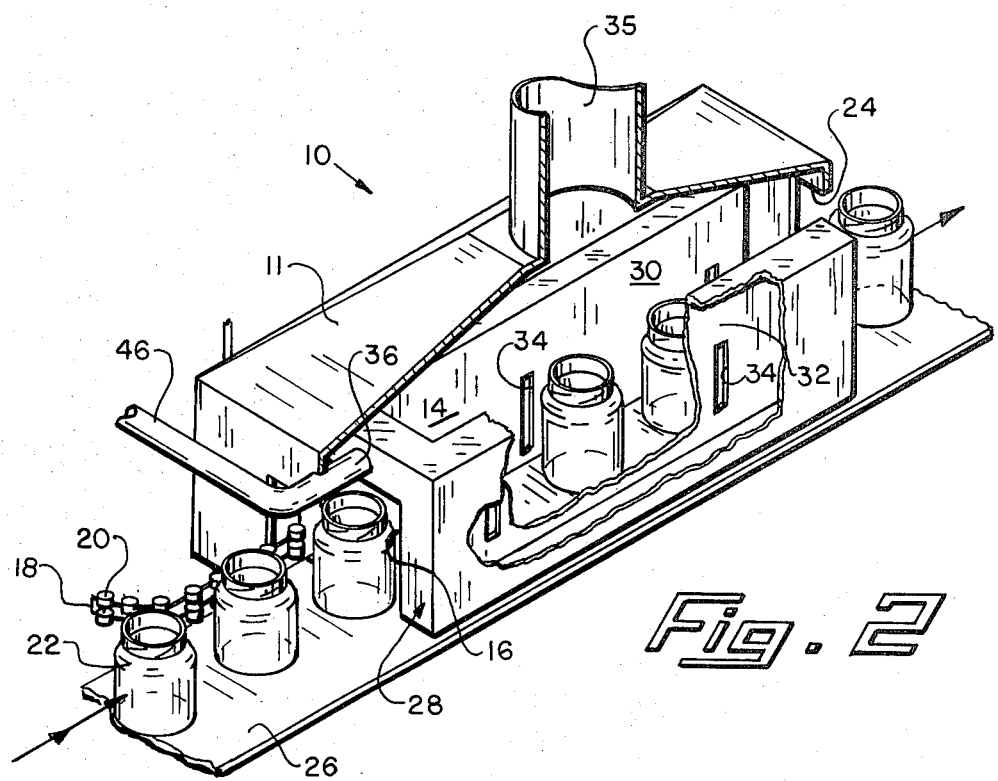
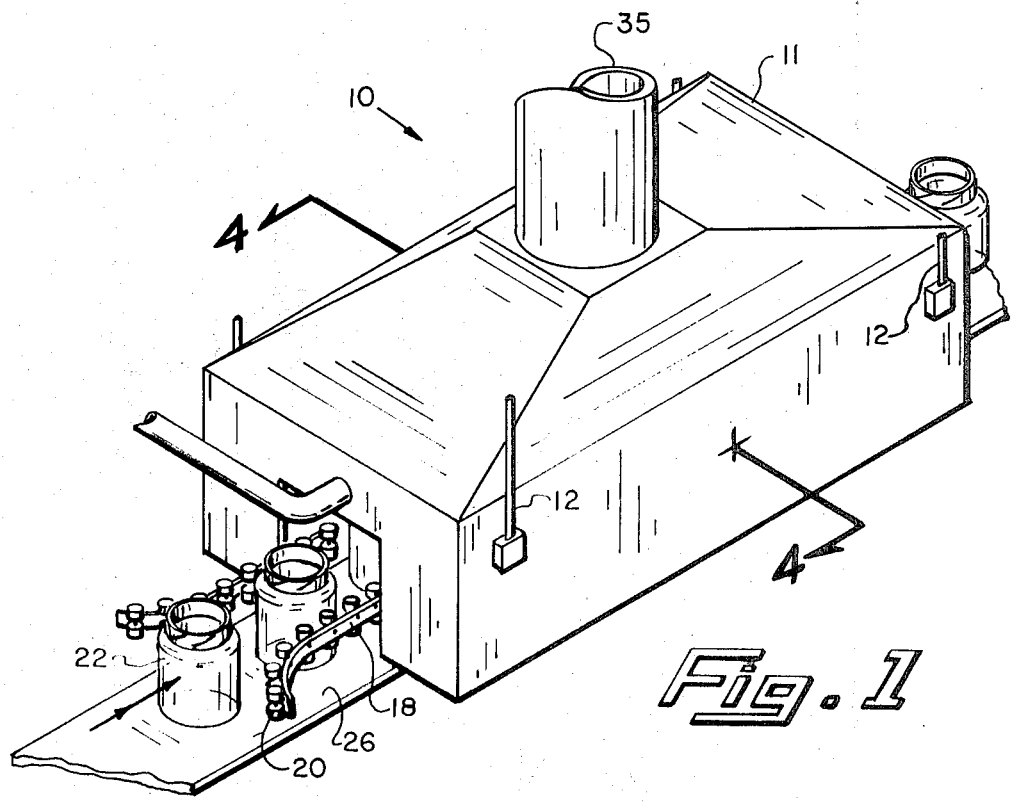

METHOD FOR TREATING VITREOUS SURFACES

BACKGROUND OF THE INVENTION

1. Field of the Invention

The present invention relates to an apparatus and method for surface treating vitreous material, for example, glass, galssware and glazed surfaces such as china or porcelain.

2. Discussion of the Prior Art

Vitreous surfaces have, particularly immediately following the formation of the surfaces, high free energy. The nature of the surface makes it susceptible to abrasion damage from other similar surfaces and to undesirable reactions with the atmosphere and/or other materials it may contact. One of the more troublesome and technically demanding aspects of this situation is the treatment of newly formed glassware. Food and beverage bottles, for instance, are quite strong, at least theoretically, when formed, but, unless protected, undergo strength degradation as a result of contact with other bottles and attacks by the atmosphere. Moisture in the atmosphere is particularly detrimental to the newly formed, unprotected glass surface. When it is considered that these bottles are processed on high-speed filling and packing lines which constantly jostle the bottles together with substantial force, it will be appreciated that damage can occur as a result of the mutual contact between the bottles. In fact, pristine treated glass bottles are unsuited for use in modern packing lines unless greatly increased quantities of glass are included with extra wall thickness to compensate for the damage and loss in strength.

As is known in the art, the problem of abrasion and atmospheric damage to glassware has been, in large part, solved by various surface treatments on the glass substantially immediately upon formation or at least prior to packing of the glass. One basic and most important facet of such treatments is the surface treatment of the glass, piror to annealing, with various metallic compounds which pyrolytically decompose upon contact with the heated, freshly formed glass to form metallic oxide surface layers on the glass or other vitreous material. Exemplary of the more widely used and better performing of these metal oxide treatments is the formation of tin oxide on glass surfaces by exposure to stannic chloride vapor. The tin oxide surface treatment, when present in films less than that which would cause objectionable light interference and iridescence, produces a surface condition which, when further coated with an organic lubricating material, is lubricous, highly resistant to abrasion damage and protective against atmospheric attack. A similar mechanism may be employed utilizing titanium tetrachloride.

While titanium or stannic chloride does not decompose to form a metallic oxide layer on the glass surface until exposed to temperatures on the order of 600° to 1,200° F., it has been found that titanium or stannic chloride vapor is subject to hydrolysis through exposure to moisture. For that reason, it is necessary to protect the treatment gas from moisture by utilizing an inert carrier gas, such as dry air. When free of water, air has been found to be a substantially inert carrier gas for stannic chloride or titanium chloride vapor. It has been possible to conduct the dry air virtually saturated with stannic chloride vapor to the heated glass surface to form a relatively even coating. On the other hand, titanium tetrachloride does not produce smooth, even titanium oxide coatings as readily. For this reason, treatment of glass virtually saturated with stannic chloride has been widely accepted and is in standard commercial use.

Unfortunately, whether using stannic chloride or titanium tetrachloride vapor, it has been found, heretofore, that a large concentration of treatment vapor was required to assure adequate metallic coating of the least accessible surface portions of the object being treated. This has been due, for the most part, to the variation in concentration of the treatment gas in the treatment atmosphere. For example, when one article moves into an area vacated by a previously treated article, the untreated article receives less exposure to the treatment gas. On the other hand, the laminar flow method of treating articles causes preferential treatment of portions of the articles. In all these cases, an excess concentration of treatment vapor is required and a rather heterogeneous coating of metallic oxide is produced on the article.

While the background has been presented with regard to glassware, this has been done because the problems involved in treating glassware with metallic oxide compositions are most demanding. Also, stannic chloride and titanium tetrachloride have been used as examples of the treatment gases. This has been done because of widespread use of such treatment gases. However, the problems discussed exist in greater or lesser extent with regard to other vitreous surfaces and other treatment gases employed to produce metallic oxide surface treatments. These are the treatment gases which will be more widely illustrated below.

SUMMARY OF THE INVENTION

The present invention relates to a method whereby treatment gas for producing metallic oxide treatments of vitreous materials can be more evenly coated while concurrently converting much greater percentage of the treatment gas to the metallic oxide coating and, consequently, largely eliminating the unused excess treatment gas. More specifically, it has been discovered that if the treatment gas is highly diluted with inert carrier gas, preferably dry air, and then directed upon the vitreous surface at a high velocity, the treatment gas is more efficiently and completely converted to metallic oxide coating and the coating is more even over the surface.

Accordingly, an object of the present invention is to provide an improved method and apparatus for treating vitreous materials so as to produce a metallic oxide coating on the latter.

Another object of the present invention is to provide an improved method and apparatus efficiently utilizing a treatment gas for treating vitreous materials so as to produce a metallic oxide coating on the latter while minimizing the amount of treatment gas required in the process.

Yet another object of the present invention is to provide an improved method and apparatus for treating vitreous materials so as to produce a thin uniform coating of metallic oxide on the latter.

Still another object of the present invention is to provide an improved method and apparatus for treating vitreous materials within a chamber wherein the chamber is maintained substantially moisture free.

Yet another object of the present invention is to provide an improved method and apparatus for treating vitreous material with treatment gas while minimizing the possibility of condensation of the latter.

These and other objects and features of the present invention will become apparent from the following descriptions.

DESCRIPTION OF THE DRAWINGS

In the drawings:

FIG. 1 is a perspective view of an article treating apparatus constructed in accordance with the present invention;

FIG. 2 is a partially broken away perspective view of the apparatus illustrated in FIG. 1;

DETAILED DESCRIPTION

Figure 3:
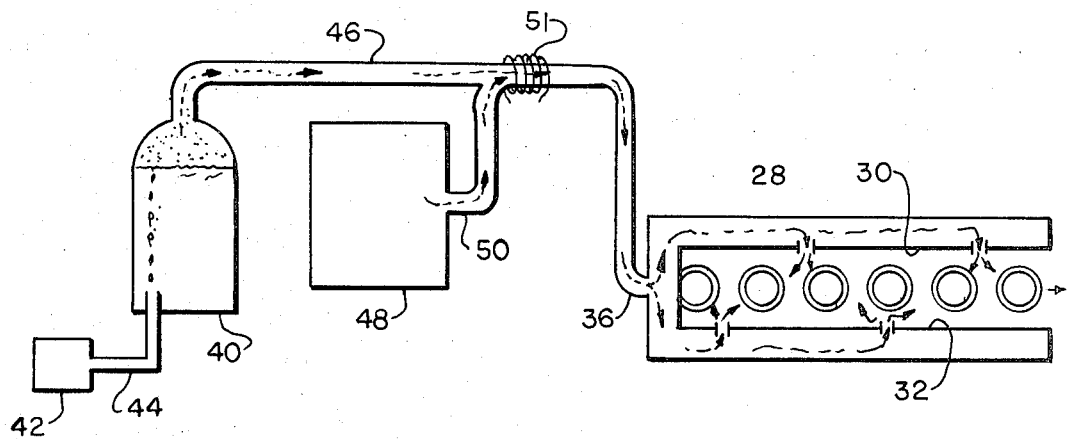
FIG. 3 is a diagrammatic view illustrating the treating method in accordance with the present invention.

The present invention is directed to a method and apparatus for treating vitreous surfaces, such as, for example, the surface of glass jars, with a treatment gas so as to provide a homogeneous protective coating of metallic oxide on the jar's surface. As stated hereinabove, this type of coating minimizes the possibility of abrasion damage to the vitreous surface as well as undesirable chemical reactions with the atmosphere and/or other materials it may contact.

In accordance with a preferred embodiment of the present invention, a highly diluted mixture of pyrolytic decomposable treatment gas, such as, for example, titanium tetrachloride, stannic chloride or the like, in an inert carrier gas, such as, for example, dry air, is generated. The highly diluted mixture is directed into the chamber of an enclosure at a plurality of spaced-apart points and at a high velocity so as to produce a highly turbulent or dynamically homogeneous atmosphere containing the treatment mixture within the chamber. In this manner, articles such as glass jars having vitreous surfaces can be moved through the chamber for treatment by the turbulent diluted mixture.

It has been found that by utilizing a highly diluted mixture of pyrolytically decomposable gas in a dry carrier gas, a preferred atmosphere can be maintained within the aforestated chamber. Specifically, the chamber can be maintained substantially moisture free which not only enhances the quality of treatment but also increases the efficient use of the treatment gas by eliminating the undesirable reaction of the treatment gas with moisture. In addition, by highly diluting the treatment gas, condensation of the latter during the treatment process is substantially eliminated. Further, it has been found that by applying the diluted mixture into the chamber at a high velocity, a turbulence is created as the mixture contacts the vitreous surface thereby producing a thinner average homogeneous coating of metallic oxide and thereby minimizing the amount of treatment gas necessary for the process.

Turning now to the drawings wherein like components are designated by like reference numerals throughout the various figures, treatment apparatus, constructed in accordance with the present invention, is illustrated and generally designated by the reference numeral 10. As shown in FIG. 1, the apparatus includes an enclosure 11 suspended by support rods 12 and defining a treatment chamber 14. An entrance aperture 16 is provided in one end of the enclosure. Guide bars 18 having rollers 20 mounted therebetween are provided to facilitate the entrance of articles to be treated, such as, for example, glass bottles 22, into aperture 16 even when the bottles are somewhat misaligned. The bottles are carried into the chamber 14 and out the opposite end of enclosure 11 through an exit aperture 24 on a conveyor 26, which is located immediately below the enclosure.

Figure 4:
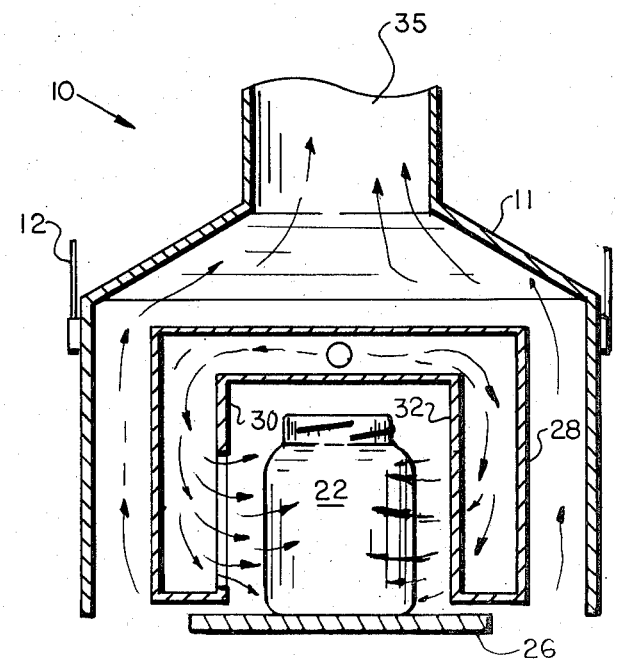
FIG. 4 is a vertical sectional view of the apparatus taken along line 4—4 in FIG. 1.

As illustrated best in FIGS. 2 and 4, distribution means, such as, for example, a plenum chamber 28 adapted to receive treatment gas for distribution into chamber 16, is disposed within the treatment chamber. In this regard, the vertically extending inside walls 30 and 32 of the plenum chamber each includes a plurality of equally horizontally spaced passages 34 which preferably take the form of a thin elongated and vertically extending slot. Each of the slots extends entirely through its respective inside wall so as to allow free passage of the treatment gas from the plenum chamber 28 into treatment chamber 14. As will be seen hereinafter, the slots are sized and positioned so as to provide a uniform flow of treatment gas into the treatment chamber and for creating a preferred atmosphere in the latter. As illustrated, a vent 35 is provided by enclosure 11 and is in communication with ends of the chamber 14 for venting purposes.

As will be seen hereinafter, the treatment gas is highly diluted in a dry carrier gas and is directed under pressure into plenum chamber 28 through a conduit 36 so as to prevent ambient moisture from entering the chamber. The various passages 34 are designed so that the highly diluted mixture of treatment gas in carrier gas enters into the treatment chamber at a high velocity.

Attention is now directed to FIG. 3 which illustrates apparatus 10 diagrammatically and which shows one way in which the highly diluted mixture of treatment gas in carrier gas is formed. Specifically, the treatment liquid is contained within a bubble tank 40. A first supply 42 of pressurized carrier gas, preferably dry air, is directed under pressure into the bubble tank through a conduit 44 so as to produce a saturated mixture of the treatment gas, such as stannic chloride or titanium tetrachloride, in the carrier gas at the top of the tank. This saturated mixture flows through a conduit 46 in the direction of plenum chamber 28. A substantially larger supply 48 of pressurized carrier gas is also directed into conduit 46 through conduit 50, as illustrated in FIG. 4. In this manner, the aforestated saturated mixture and additional carrier gas combine to produce a highly diluted mixture which moves into the plenum chamber at a higher pressure. A conventional heater 51 may be provided at the intersection of conduits 46 and 50 for minimizing the possibility of titanium crystalization at the point of intersection when titanium tetrachloride is used.

As illustrated in FIGS. 2 and 3, the passages 34 (shown diagrammatically in FIG. 4) are positioned in rows on opposite sides of the treatment chamber in a staggered fashion. The passages are designed so that the dilute mixture of treatment gas entering into plenum chamber 28 is directed into the treatment chamber through the various slots in a uniform manner and at high velocities. As the bottles 22 pass through the treatment chamber, contact with the high velocity diluted mixture creates a turbulence within the treatment chamber causing the production of a thin average homogeneous coating of metallic oxide thereon.

In a working embodiment of the present invention, a carrier gas comprising dry air was bubbled through tank 40 at a rate of approximately 20 cubic feet per hour for producing the aforestated saturated mixture. The saturated mixture was combined with additional dry air from supply 48, the latter being applied at a rate of approximately 800 cubic feet per hour. Hence, the flow of carrier gas in the mixture was increased by a factor of approximately 40. In this regard a dilution factor range of 20 to 100 (a rate range of additional air of 400 to 2,000 cubic feet per hour) has been found to be entirely satisfactory for attaining the aforedescribed advantages in the treatment of vitreous surfaces.

In further accordance with the aforestated working embodiment of the present invention, the passages 34 were designed so that the dilute mixture of treatment gas in carrier gas passed through the passages and into the treatment chamber at a rate of approximately 200 cubic feet per hour per passage. However, a range of 100 to 500 cubic feet per hour per passage has been found to be completely satisfactory. The treatment chamber in the working embodiment was approximately 36 inches from the entrance aperture 16 to the exit aperture 24. The first passage was located through the sidewall 22 approximately 6 inches from entrance aperture 16. The second passage was located in sidewall 30 approximately 12 inches from the entrance aperture. The third passage was located in sidewall 30 approximately 24 inches away from the entrance aperture.

Two important characteristics, i.e., coating uniformity and abrasion resistance, were determined under varying comparative conditions as follows:

EXAMPLE I

Figure 6:
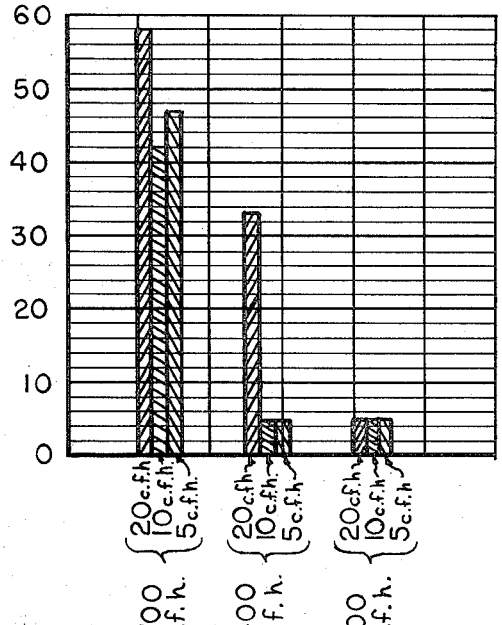
FIG. 6 is a bar graph illustrating the relationship between abrasion resistance and various dilution rates using a constant absolute amount of titanium tetrachloride as treatment gas.
Figure 5:
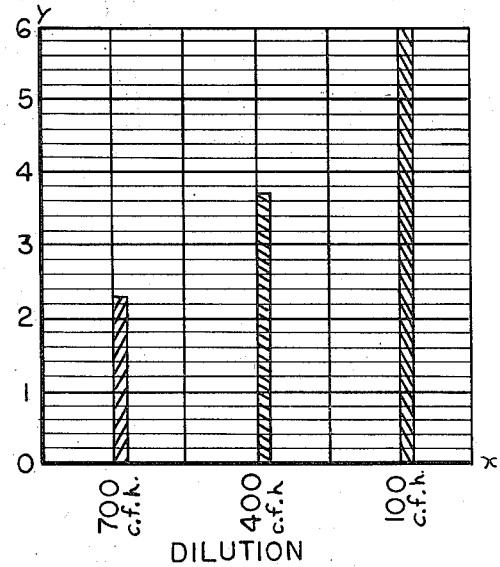
FIG. 5 is a bar graph illustrating the relationship between the average coating variation (Max/Min) and various dilution rates using a constant absolute amount of titanium tetrachloride as treatment gas.

Characteristic to be determined:
Coating uniformity and abrasion resistance of baby food jars.
Conditions:
Jars were transported through a treatment chamber at 100 feet/minute.
Treatment gas used:
Titanium tetrachloride.
Application of treatment gas:
Air bubbled (dew point of $-100°$ F.) through liquid titanium tetrachloride ($110°$ F.) at 20 cubic feet/hour to obtain constant saturated mixture; additional air (dew point of $-100°$ F.) was mixed with saturated mixture at variable rates.
Results:

It was found that by increasing the amount of air added to the saturated mixture by a factor of four (i.e., increasing dilution of the mixture by four), the average coating variation decreased by a factor of approximately two-thirds (see FIG. 5) while the abrasion resistance increased approximately six times (see FIG. 6). By increasing the amount of additional air by a factor of seven, average coating variation decreased by a factor of approximately five-twelfths (see FIG. 5) and abrasion resistance increased by a factor of approximately 12 (see FIG. 6).

EXAMPLE II

Figure 8:
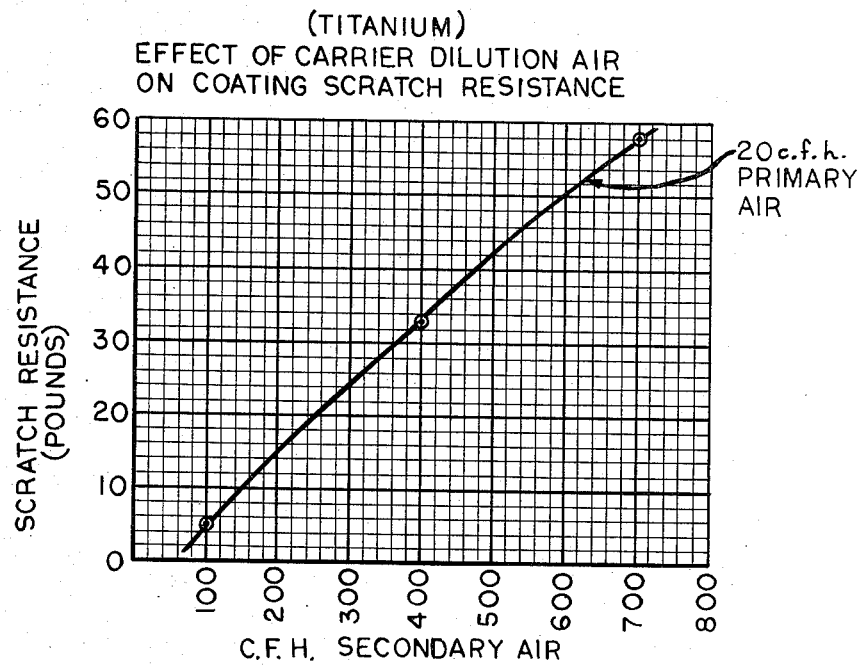
FIG. 8 is a cartesian graph illustrating the relationship between abrasion resistance and various dilution rates using a constant absolute amount of titanium tetrachloride as treatment gas.
Figure 7:
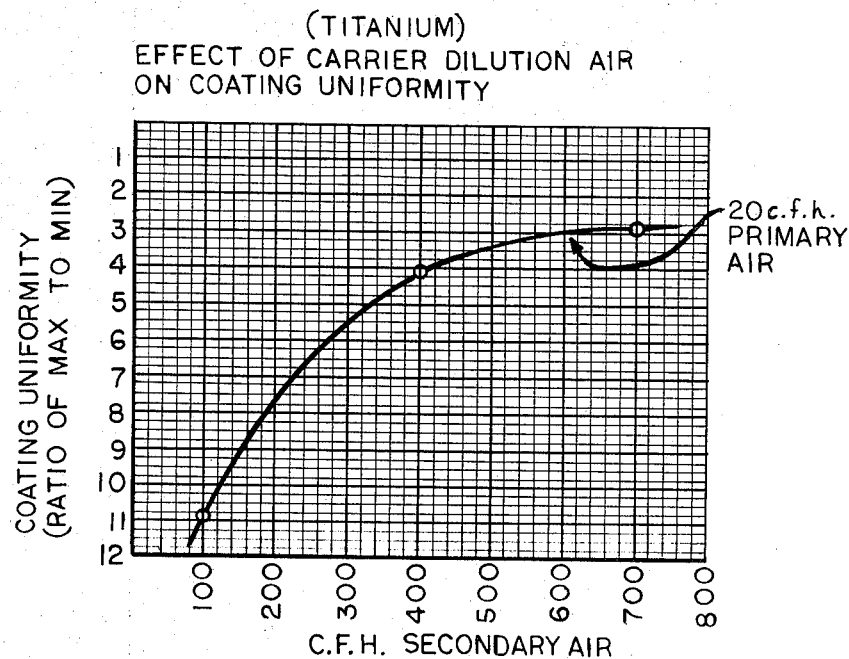
FIG. 7 is a cartesian graph illustrating the relationship between average coating variation (Max/Min) and various dilution rates using a constant absolute amount of titanium tetrachloride as treatment gas.

Characteristic to be determined:
Coating uniformity and abrasion resistance of baby food jars.
Conditions:
Jars were transported through a treatment chamber at 100 feet/minute.
Treatment gas:
Tatanium tetrachloride.
Application of treatment gas:
Air bubbled (dew point of $-100°$ F.) through liquid titanium tetrachloride ($110°$ F.) at 20 cubic feet/hour to obtain constant saturated mixture; additional air (dew point of $-100°$ F.) was mixed with saturated mixture at variable rates.
Results:

It was found that by increasing the amount of air added to the saturated mixture by a factor of four, the average coating variation decreased by a factor of approximately four-elevenths (see FIG. 7) while the abrasion resistance increased by a factor of approximately seven (see FIG. 8); by increasing the amount of additional air by a factor of seven, average coating variation decreased by a factor of approximately three-elevenths (see FIG. 7) while abrasion resistance increased by a factor of approximately twelve (see FIG. 8).

In the foregoing examples, the amount of treatment of treatment gas was held constant. However, by increasing the amount of air (carrier gas) added to the saturated mixture of treatment gas and air, that is, by increasing the dilution of the mixture, the treatment coating on the bottle was found to be more uniform and the abrasion resistance enhanced. This was true for both stannic chloride and titanium tetrachloride.

Although only one embodiment of the invention has been shown and described, various modifications as may appear to those skilled in the art are meant to be within the contemplation of the invention as defined in scope by the claims.

What is claimed is:

1. A method of treating vitreous articles to enhance the abrasion resistance of said articles, comprising: forming a substantially saturated mixture of a pyrolytically decomposible compound selected from the group consisting of stannic chloride and titanium tetrachloride and a carrier gas inert to the compound by bubbling greater than about 5 cubic feet per hour of the carrier gas through the pyrolytically decomposible compound, adding additional amounts of carrier gas to the substantially saturated mixture at rates of between 20 and 100 times the rate at which the substantially saturated mixture is provided, conducting the thus formed dilute mixture of treated gas and carrier gas to an enclosure to maintain said enclosure substantially moisture free by directing the dilute mixture through a plurality of passages at a velocity between 400 cubic feet per hour divided by the number of passages whereby turbulent conditions are produced within the enclosure as the mixture contacts the vitreous surface.

2. A method as recited in claim 1 wherein said dilute mixture is directed into the enclosure at a plurality of equally spaced-apart passages whereby the vitreous articles are coated uniformly with the pyrolytically decomposable compound of said carrier gas.

3. A method as recited in claim 1 wherein said dilute mixture is simultaneously directed into said enclosure at a first plurality of substantially equally spaced passages situated along one side of said enclosure and a second plurality of substantially equally spaced passages situated on the opposite side of said enclosure and staggered with respect to said first plurality of passages whereby the vitreous articles are coated uniformly with the pyrolytically decomposable compound of said carrier gas.

4. A method of treating vitreous articles to enhance the abrasion resistance of said articles comprising: forming a substantially saturated mixture of a pyrolytically decomposible compound selected from the group consisting of stannic chloride and titanium tetrachloride and a carrier gas inert to the compound by bubbling greater than 5 cubic feet of carrier gas through the pyrolytically decomposible compound, adding additional amounts of carrier gas to the substantially saturated mixture at rates of between 20 to 100 times the rate at which the substantially saturated mixture is provided, conducting the thus formed dilute mixture of treated gas to an enclosure to maintain said enclosure in a substantially moisture free condition by directing the dilute mixture through a plurality of passages at a velocity between 400 cubic feet per hour divided by the number of passages to 2,000 cubic feet per hour divided by the number of passages whereby turbulent conditions within the enclosure are produced as the mixture contacts the vitreous surface.

5. A method as recited in claim 4 wherein said treatment gas is stannic chloride and the dilute mixture is directed into the enclosure at a plurality of spaced-apart passages whereby the vitreous articles are coated uniformly with the pyrolytically decomposable stannic chloride.

* * * * *